United States Patent [19]
Higuchi et al.

[11] Patent Number: 5,942,823
[45] Date of Patent: Aug. 24, 1999

[54] MOTOR AND A LATERAL PRESSURE MECHANISM FOR THE SAME

[75] Inventors: Daisuke Higuchi; Syunji Matsushima; Hiroyuki Kiuchi, all of Nagano, Japan

[73] Assignee: Kabushiki Kaisha Sankyo Seiki Seisakusho, Nagano, Japan

[21] Appl. No.: 09/181,674

[22] Filed: Oct. 29, 1998

[30] Foreign Application Priority Data

Oct. 29, 1997 [JP] Japan ..................................... 9-296091

[51] Int. Cl.⁶ ....................................................... H02K 5/16
[52] U.S. Cl. .............................................. 310/90; 384/192
[58] Field of Search ................................ 310/90; 384/192

[56] References Cited

U.S. PATENT DOCUMENTS

| | | | |
|---|---|---|---|
| 3,483,888 | 12/1969 | Wurzel | 137/539 |
| 3,754,802 | 8/1973 | Keller | 384/203 |
| 4,655,616 | 4/1987 | Ducan | 384/446 |
| 4,806,025 | 2/1989 | Kamiyama et al. | 384/202 |
| 4,887,916 | 12/1989 | Adam et al. | 384/192 |
| 5,326,178 | 7/1994 | Strobl | 384/192 |
| 5,360,274 | 11/1994 | Strobl | 384/192 |
| 5,684,349 | 11/1997 | Hara et al. | 310/77 |

*Primary Examiner*—Nestor Ramirez
*Assistant Examiner*—Joseph Waks
*Attorney, Agent, or Firm*—Sughrue, Mion, Zinn, Macpeak & Seas, PLLC

[57] ABSTRACT

A lateral pressure mechanism 4 for a motor has a first ring 5 which is fixed to a stator-side member 2 so as to surround a rotary shaft 50; a second ring 6 which is disposed inside the first ring so as to surround the rotary shaft 50, and which is radially movable inside the first ring 5; and a wire spring 7 which is bridged between two engaging portions 11 and 13 of the first ring 5 so that an intermediate part abuts against the outer peripheral surface of the second ring.

15 Claims, 5 Drawing Sheets

MOTOR AND A LATERAL PRESSURE MECHANISM FOR THE SAME

BACKGROUND OF THE INVENTION

1. Field of the Invention

The present invention relates to a lateral pressure mechanism for a motor which is used in a rotary driving device for a CD (Compact Disk) or the like.

2. Related Art

As a motor which is used in a rotary driving device for a CD or the like, known is a motor of the shaft rotation type in which a rotor case having a mounting unit for a disk, and a rotary shaft elongating from the rotor case are rotatably supported via a bearing on a motor frame. In such a motor of the shaft rotation type, a sintered oil-impregnated bearing which is more economical than a ball bearing and in which high-speed rotation is enabled is often used. A motor which uses a slide bearing such as a sintered oil-impregnated bearing must be configured so that a clearance is adequately formed between the inner peripheral surface of the bearing and the outer peripheral surface of a rotary shaft in order to allow the rotary shaft to smoothly rotate in the bearing. However, this clearance produces rattling in the rotary shaft, whereby the motor is caused to vibrate when it is driven.

Figure 5A:
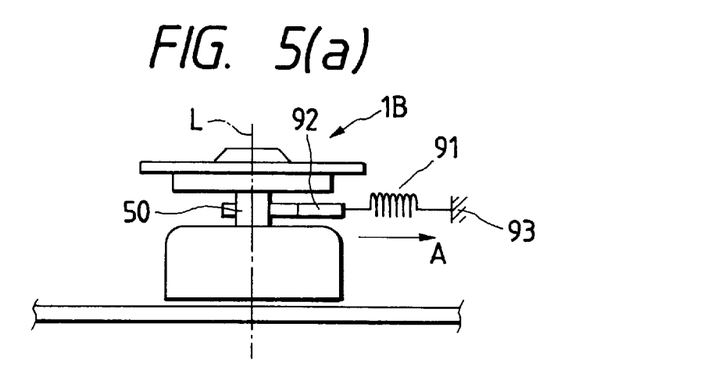
FIGS. 5(a), 5(b), and 5(c) are diagrams showing lateral pressure mechanisms for a motor of the prior art.

To comply with the above, in a motor 1B shown in FIG. 5(a), a lateral pressure mechanism is configured in which one end of a coil spring 91 is attached to an apparatus 93 on which the motor 1B is mounted, and the other end is connected via an engagement hook 92 to the rotary shaft 50 of the motor 1B, whereby a rotary shaft 50 is pulled in a direction (the direction of the arrow A) which is substantially perpendicular to the axis L of the shaft. When a lateral pressure is applied to the rotary shaft 50 in this way, the outer peripheral surface of the rotary shaft 50 is forcedly pressed against one place of the inner peripheral surface of the bearing. Therefore, the rotary shaft 50 is prevented from rattling.

Figure 5B:
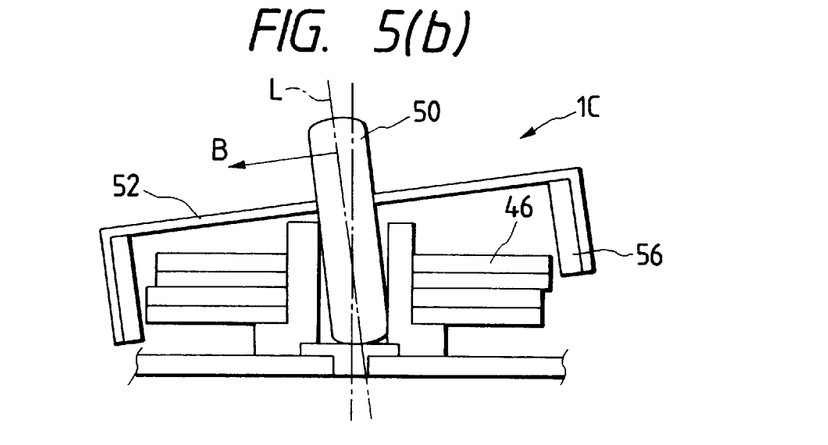

In a motor 1C shown in FIG. 5(b), a stator core 46 is formed into a shape which is asymmetric with respect to the rotary shaft 50. When the stator core is formed in this way, the magnetic attraction force of a rotor magnet 56 which is applied to the stator core 46 is unbalanced, and hence a rotor case 52 is inclined as indicated by the arrow B. As a result, the rotary shaft 50 is pressed against one place of the inner peripheral surface of the bearing. Therefore, the rotary shaft 50 is prevented from rattling.

Figure 5C:
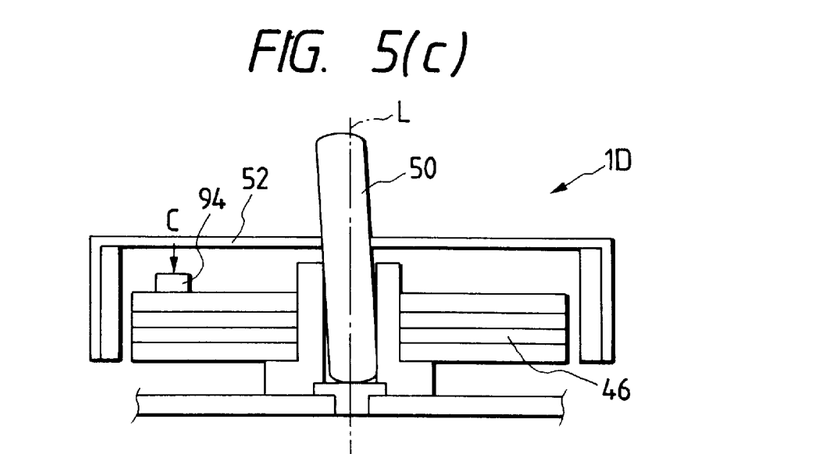

In a motor 1D shown in FIG. 5(c), a magnet 94 is additionally disposed in one place of the upper face of a stator core 46. Also in this configuration, a rotor case 52 is inclined because the magnet 94 magnetically attracts the rotor case 52 as indicated by the arrow C. Consequently, the rotary shaft 50 is pressed against one place of the inner peripheral surface of the bearing. Therefore, the rotary shaft 50 is prevented from rattling.

However, the motor 1B having the lateral pressure mechanism which pulls the rotary shaft 50 by using the coil spring 91 as shown in FIG. 5(a) requires a space for disposing the coil spring 91 and the hook 92 outside the motor 1B. This impedes miniaturization and thinning of the apparatus 93 using the motor 1B. Even if the lateral pressure mechanism is to be disposed inside the motor 1B, the coil spring 91 must be disposed in a stretched state in order to attain a sufficient lateral pressure. Consequently, it is difficult to ensure a space for disposing the coil spring 91 in such a state, inside the small motor 1B.

In the motors 1C and 1D having a structure which uses a magnetic attraction force as shown in FIGS. 5(b) and 5(c), when the outer diameter of the rotor case 52 is reduced as a result of miniaturization, the portion which is to be magnetically attracted becomes closer to the rotary shaft 50. Therefore, the moment of the magnetic attraction force about the rotary shaft 50 is reduced, so that the rotor case 52 is hardly inclined. When the shape of the stator core is changed or a magnet for attraction is added as in the case of the motors 1C and 1D, the magnetic circuit is unbalanced, thereby producing a problem in that cogging occurs and the rotor case 52 cannot smoothly rotate.

SUMMARY OF THE INVENTION

It is an object of the invention to provide a lateral pressure mechanism for a motor which can solve the above-discussed problems, which can be incorporated even into a small motor, and which can apply a lateral pressure sufficient for preventing a rotary shaft from rattling.

An aspect of the present invention, there is provided a lateral pressure mechanism for a motor comprising:

a first ring fixed to a stator-side member so as to surround a rotary shaft of a rotor-side member, said rotary shaft being rotatably supported via a bearing on said stator-side member;

a second ring disposed inside said first ring so as to surround said rotary shaft, said second ring being radially movable inside said first ring; and a wire spring which is bridged between two portions disposed on said first ring so that an intermediate part of said wire spring elastically abuts against an outer peripheral surface of said second ring.

As described above, the lateral pressure mechanism for a motor of the invention is provided in that an intermediate part of a wire spring which is bridged between two engaging portions of a first ring surrounding a rotary shaft elastically abuts against the outer peripheral surface of a second ring which is radially movable inside the first ring, thereby applying a lateral pressure to the rotary shaft so as to eliminate rattling of the rotary shaft.

According to the invention, therefore, both the first and second rings are disposed so as to surround the rotary shaft and the wire spring is held inside the first ring, so that, as far as a space of a size which allows the first ring to be disposed therein is formed in the periphery of the rotary shaft, the lateral pressure mechanism can be incorporated even into a small motor. Since the shape-restoring force of the wire spring which is supported at both the ends by the first ring is obtained from the intermediate part of the wire portion, a high lateral pressure can be stably obtained although the spring is so small that it can be held inside the first ring. Therefore, the lateral pressure mechanism is suitable to be incorporated into a small motor. Unlike a configuration in which the lateral pressure is directly applied from the wire spring to the rotary shaft, the lateral pressure is applied from the wire spring to the rotary shaft via the second ring. Therefore, phenomena such as wear of the wire spring and the rotary shaft do not occur. Furthermore, unlike a configuration in which the lateral pressure is applied to the rotary shaft via the bearing, the bearing is not required to be radially movable or inclinable. In this way, the invention has an advantage that it can be configured by a simple structure.

When the second ring is disposed on the end face of the bearing, the second ring can be disposed so as to be radially movable, by using, as it is, the flat portion (the upper end face of the bearing) which is conventionally formed in the motor.

When the invention is applied to a motor of the type in which the end face of the bearing on which the second ring is disposed is in a level position between lower and upper end faces of the coil, the space which serves as a dead space in a motor of the prior art, i.e., the space defined by the coil and the bearing can be effectively used. Consequently, it is not required to ensure a special space for configuring the lateral pressure mechanism inside the motor, and hence the invention is suitable for incorporating the lateral pressure mechanism into a small motor.

DETAILED DESCRIPTION OF THE PREFERRED EMBODIMENTS

Hereinafter, embodiments of the invention will be described with reference to the accompanying drawings.

First Embodiment

Figure 1:
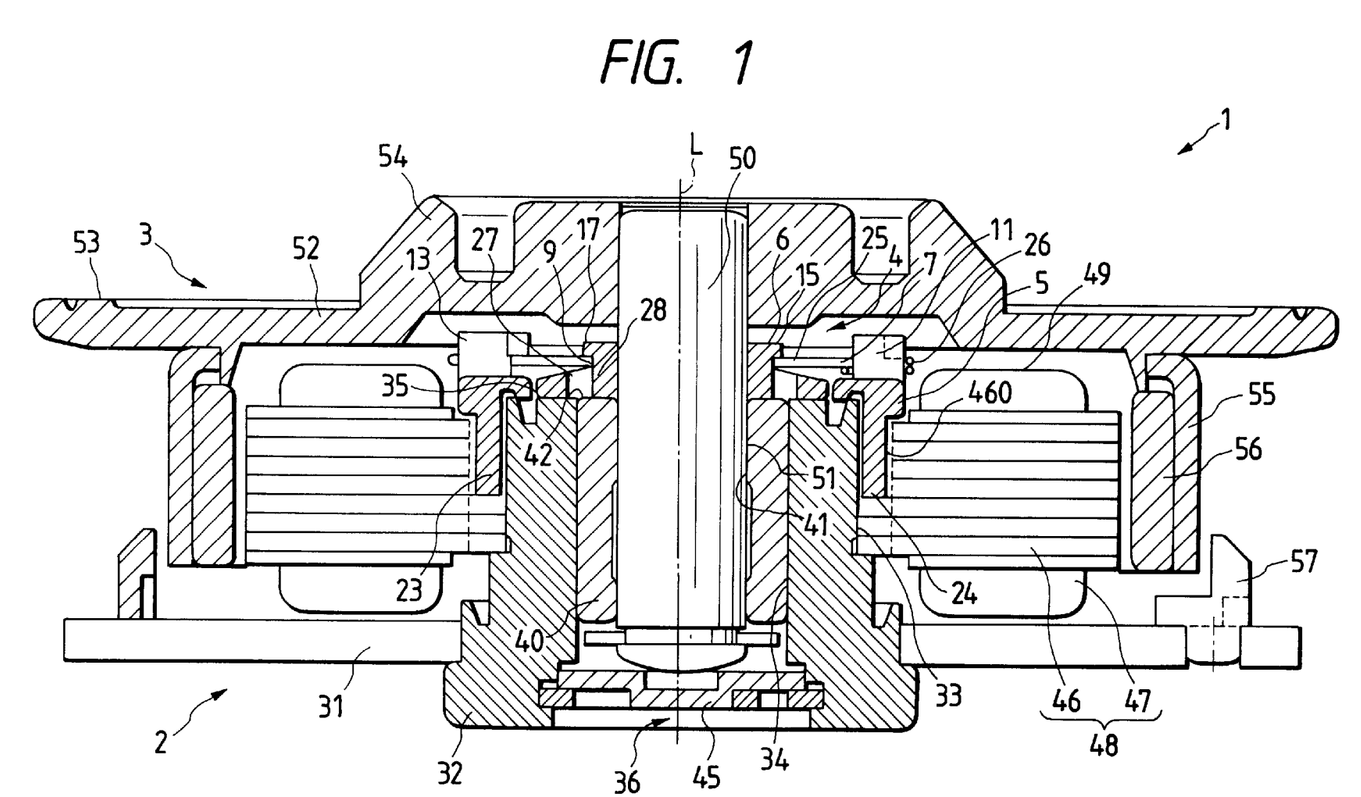
FIG. 1 is a section view showing a motor which is Embodiment 1 of the invention.

FIG. 1 is a section view showing a motor having a built-in lateral pressure mechanism which is a first embodiment of the invention. As shown in FIG. 1, the motor 1 comprises a stator-side member 2 having a motor frame 31 and a stator core 46, and a rotor-side member 3 having a rotary shaft 50 which is rotatably supported via a bearing 40 on the stator-side member 2. A cylindrical sleeve-like bearing holder 32 is attached to the motor frame 31. The stator core 46 is attached to the outer peripheral surface 33 of the bearing holder 32. A coil 47 is wound around the stator core 46, thereby constituting an armature 48. The cylindrical sintered oil-impregnated bearing 40 (hereinafter, referred to as the bearing 40) is fitted into the inner peripheral surface 34 of the bearing holder 32. The rotary shaft 50 is supported inside the bearing 40 in a rotatable state. A thrust bearing 45 is attached to a lower opening 36 of the bearing holder 32 so as to support a lower end portion of the rotary shaft 50.

A rotor case 52 is attached to an upper end portion of the rotary shaft 50. An upper end plate 53 of the rotor case 52 has a disk-like shape to serve as a mounting face for a recording disk (not shown). A center portion 54 of the upper face 53 of the rotor case 52 protrudes in a disk-like shape, so as to function as a guide for mounting the recording disk. The rotor case 52 has a cylindrical outer peripheral portion 55. An annular rotor magnet 56 which is opposed to the armature 48 is attached to the inner peripheral surface of the rotor case. An annular seal member 57 is attached to the motor frame 31 so as to surround the opening end of the outer peripheral portion 55 of the rotor case 52 via a minute gap.

In the thus configured motor 1, a lateral pressure mechanism 4 is mounted in order to prevent rattling due to a clearance between the outer peripheral surface 51 of the rotary shaft 50 and the inner peripheral surface 41 of the bearing 40. In the embodiment, the upper end face 42 (the end face on the side of the rotor case 52) of the bearing 40, and the upper end face 35 of the bearing holder 32 are in the same plane. The upper end faces 42 and 35 are at a level which is lower than the upper end face 49 of the coil 47 that is wound around the stator core 46. In the embodiment, the lateral pressure mechanism 4 is configured by using a space defined by the lower end face of the rotor case 52 in the vicinity of the rotary shaft 50, the coil 47, and the bearing 40.

Figure 2A:
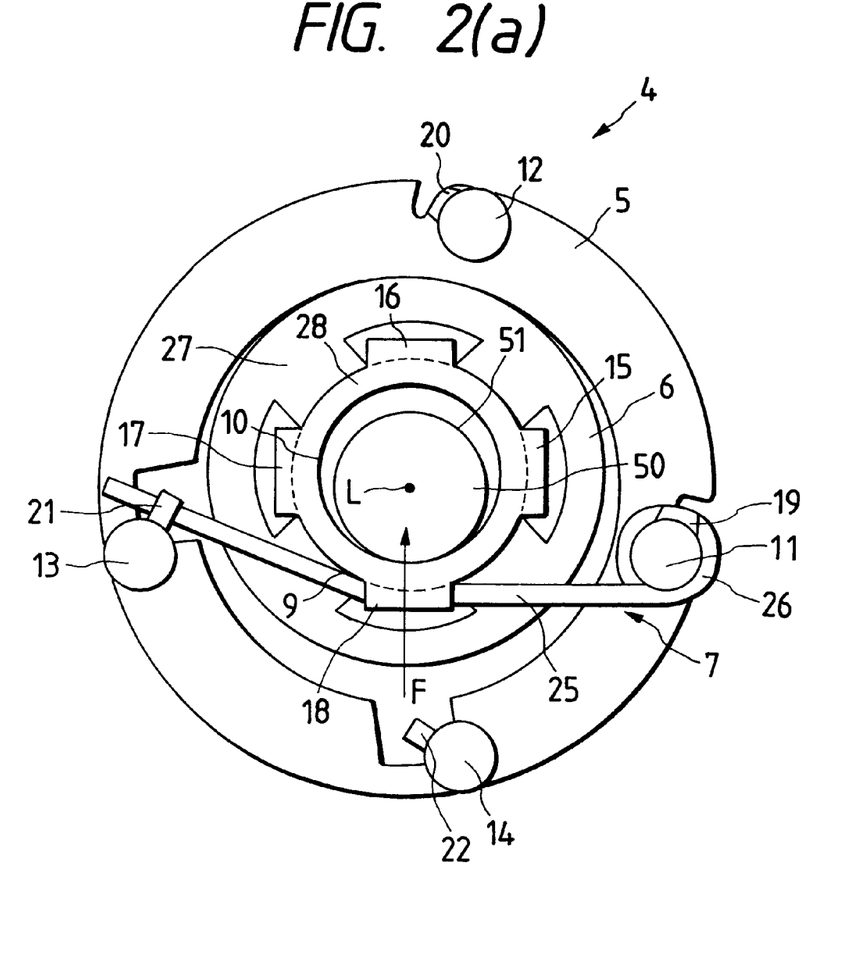
FIGS. 2(a), 2(b), and 2(c) are a plan view of the vicinity of a rotary shaft of the motor shown in FIG. 1, a longitudinal section view of an engaging portion configured on a first ring, and a longitudinal section view of another engaging portion configured on the first ring, respectively.

FIG. 2(a) is a plan view of the vicinity of the rotary shaft 50 where the lateral pressure mechanism 4 of the embodiment is configured. As shown in FIGS. 1 and 2(a), the lateral pressure mechanism 4 comprises a first ring 5 which is disposed so as to surround the rotary shaft 50, a second ring 6 which is disposed inside the first ring 5 so as to surround the rotary shaft 50, and a wire spring 7 which is made of a metal such as stainless steel, and which is attached to the first ring 5 so as to cause the second ring 6 to be eccentric with respect to the first ring 5. Both the first and second rings 5 and 6 are made of a synthetic resin, and at least the second ring 6 is made of a synthetic resin material of an excellent sliding property, such as nylon. The materials of the first and second rings 5 and 6 are not restricted to a synthetic resin, and may be a metal, ceramics, or the like. Particularly, the second ring 6 may be made of a sintered oil-impregnated material of an excellent sliding property.

The first ring 5 is disposed on the upper end face 35 of the stator core 46, and is fixed to the stator-side member 2 under the state where two protrusions 23 and 24 protruding from the lower face are fitted into holes 460 of the stator core 46, respectively. As the fixing method, bonding fixation or press fitting fixation may be used. Four round rod-like engaging portions 11 to 14 for holding the wire spring 7 protrude from the upper face of the first ring 5. The wire spring 7 is bridged between two opposing ones of the engaging portions 11 to 14, for example, the engaging portions 11 and 13, or the engaging portions 12 and 14.

Figure 2B:
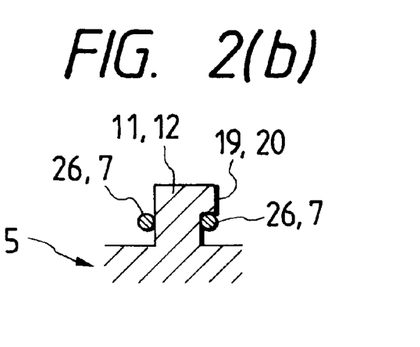

In the embodiment, among the engaging portions 11 to 14, the engaging portions 11 and 12 are configured as shown in an enlarged longitudinal section view of FIG. 2(b) so that locking portions 19 and 20 are formed on the upper half portions of the round rod-like engaging portions 11 and 12 so as to slightly laterally overhang therefrom. By contrast, the engaging portions 13 and 14 are configured as shown in an enlarged longitudinal section view of FIG. 2(c) so that locking portions 21 and 22 are formed in the vicinity of the upper ends of the round rod-like engaging portions 13 and 14 so as to laterally overhang therefrom. With respect to the engaging portions 11 and 13, and the engaging portions 12 and 14, the locking portions 19, 20, 21, and 22 overhang in a relatively opposite direction along the circumferential direction of the first ring 5.

Figure 2C:
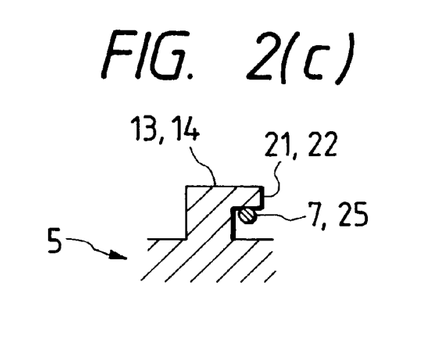

The wire spring 7 comprises a coil portion 26 which is doubly looped so as to be fitted onto the engaging portion 11, and a wire portion 25 which elongates from the coil portion 26 and which is engaged at the tip end portion with the engaging portion 13. As shown in FIG. 2(b), the coil portion 26 of the wire spring 7 passes over the locking portion 19 or 20 and is fitted onto the engaging portion 11 or 12 so as to be positioned below the locking portion, whereby the coil portion is prevented from accidentally slipping off from the engaging portion 11 or 12. As shown in FIG. 2(c), the tip end portion of the wire portion 25 of the wire spring 7 passes below the locking portion 21 or 22 of the engaging portion 13 or 14 so as to prevent the wire portion 25 from being accidentally upward disengaged from the engaging portion 13 or 14.

Referring again to FIGS. 1 and 2(*a*), the second ring 6 is disposed inside the first ring 5 so as to elongate from the upper end face 42 of the bearing 40 to the inner peripheral portion of the upper end face 35 of the bearing holder 32. The rotary shaft 50 passes inside the second ring 6. Since the inner diameter of the second ring 6 is slightly larger than the outer diameter of the rotary shaft 50, the rotary shaft 50 is loosely fitted into the second ring 6. The outer diameter of the second ring 6 is slightly smaller than the inner diameter of the first ring 5. Therefore, the second ring 6 is radially movable inside the first ring 5.

In the second ring 6, the upper half portion 28 is smaller in diameter than the lower half portion 27. Four rectangular projections 15 to 18 project from the outer peripheral surface 9 of the upper half portion 28 at substantially constant angular intervals. The wire portion 25 of the wire spring 7 passes below the projections 15 to 18. With respect to the line connecting the engaging portions 11 and 13 of the first ring 5, the outer peripheral surface 9 of the second ring 6 outward overhangs. Therefore, the wire portion 25 of the wire spring 7 is bent, and an intermediate part of the portion elastically abuts against the outer peripheral surface 9 of the second ring 6.

In this way, the intermediate part of the wire portion 25 of the wire spring 7 elastically presses the second ring 6 as indicated by the arrow F, by means of the shape-restoring force of the portion. Consequently, the second ring 6 is caused to be eccentric in the direction indicated by the arrow F, so that the inner peripheral surface 10 of the second ring 6 transmits a lateral pressure in a direction which is substantially perpendicular to the axis L of the shaft, to the outer peripheral surface 51 of the rotary shaft 50. This causes the outer peripheral surface 51 of the rotary shaft 50 to be forcedly pressed against one place of the inner peripheral surface 41 of the bearing 40. Therefore, it is possible to eliminate rattling of the rotary shaft 50 which is due to a clearance between the outer peripheral surface 51 of the rotary shaft 50 and the inner peripheral surface 41 of the bearing 40.

As described above, in the lateral pressure mechanism 4 of the embodiment, both the first and second rings 5 and 6 are disposed so as to surround the rotary shaft 50 and the wire spring 7 is held inside the first ring 5. Therefore, it is required only to form a space of a size which allows the first ring 5 to be disposed therein, in the periphery of the rotary shaft 50. As a result, the lateral pressure mechanism 4 can be incorporated into the small motor 1. Since the shape-restoring force of the wire spring 7 which is supported at both the ends by the first ring 5 is output from the intermediate part of the wire portion 25, the wire spring 7 stably generates a high lateral pressure although the spring is so small that it can be held inside the first ring 5. Therefore, the lateral pressure mechanism 4 of the embodiment is suitable to be incorporated into a small motor. When the lateral pressure is directly applied to the metal rotary shaft 50 from the metal wire spring 7, the wire spring 7 and the rotary shaft 50 largely wear because of high friction between the metals. By contrast, in the embodiment, the wire spring 7 does not wear because the lateral pressure is applied to the rotary shaft 50 from the wire spring 7 via the second ring 6 which is made of a synthetic resin of an excellent sliding property. Unlike a configuration in which the lateral pressure is applied to the rotary shaft 50 via the bearing 40, for example, the bearing 40 is not required to be radially movable or inclinable. In this way, the embodiment has an advantage that it can be configured by a simple structure.

Furthermore, both the first and second rings 5 and 6 are substantially circular. Even when the rings are oriented in any direction, therefore, a lateral pressure of the same strength can be obtained. The two sets of engaging portions (the engaging portions 11 and 13, and 12 and 14) around each of which the wire spring 7 can be laid are formed on the first ring 5. Even when the wire spring 7 is laid around any one of the two sets, therefore, a lateral pressure of the same strength can be obtained. Consequently, the work of incorporating the lateral pressure mechanism 4 into the motor 1 can be easily performed.

In the embodiment, the second ring 6 is disposed so as to be radially movable on the upper end face 42 of the bearing 40. In other words, the second ring 6 is disposed by using, as it is, the flat portion (the upper end face 42 of the bearing 40) which is conventionally formed in the motor 1. Therefore, it is not required to change the basic design of the motor 1.

In the motor 1 of the invention, moreover, the upper end face 42 of the bearing 40 on which the second ring 6 is disposed is at a level which is lower than the upper end face 49 of the coil 47 that is wound around the stator core 46. Therefore, the space which serves as a dead space in a motor of the prior art, i.e., the space defined by the lower end face of the rotor case 52 in the vicinity of the rotary shaft 50, the coil 47, and the bearing 40 is effectively used. Consequently, it is not required to ensure a special space for configuring the lateral pressure mechanism 4 inside the motor 1, and hence the embodiment is suitable for incorporating the lateral pressure mechanism 4 into the small motor 1. Particularly, the clearance distance between the upper end face 49 of the coil 47 and the lower end face of the rotor case 52 can be made minimum. This is suitable for thinning the motor 1.

Second Embodiment

Figure 3:
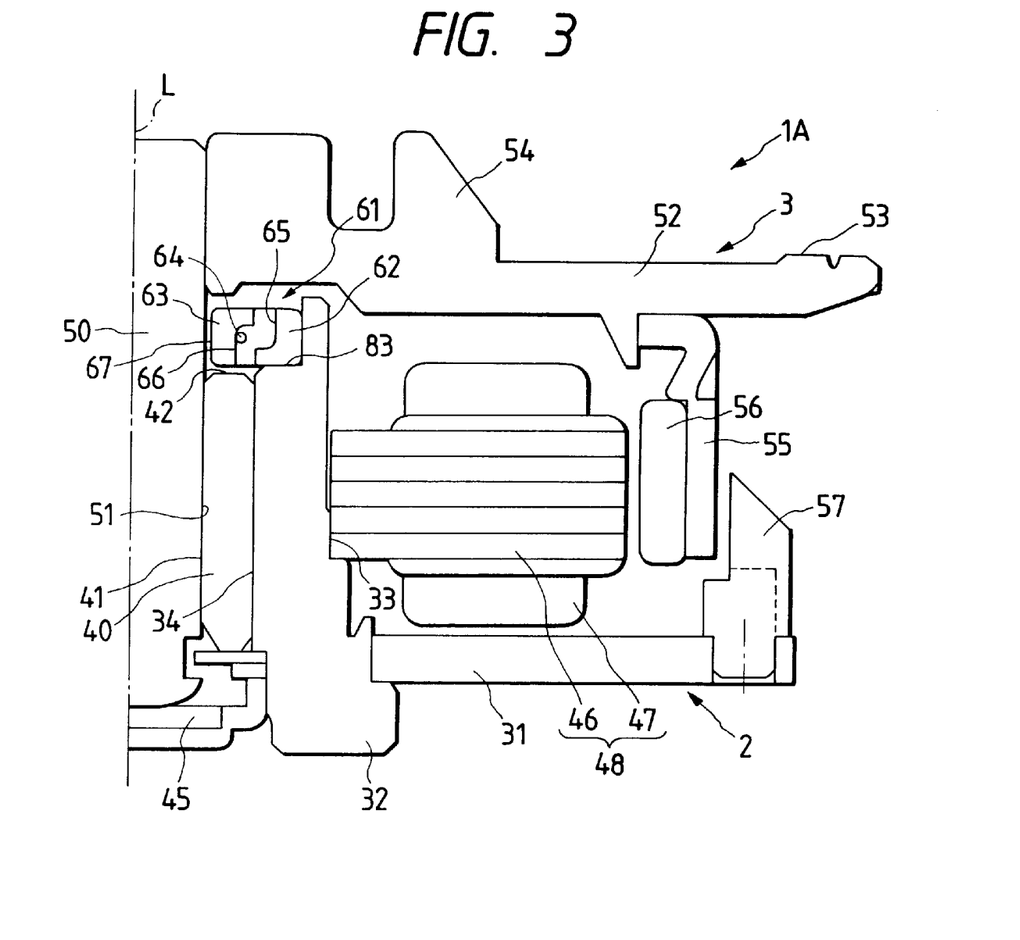
FIG. 3 is a half section view of a motor which is Embodiment 2 of the invention.

FIG. 3 is a half section view of a motor which is Embodiment 2 of the invention. The motor of the embodiment is basically configured in the same manner as the motor of Embodiment 1. Therefore, components having the same function are designated in FIG. 3 by the same reference numerals, and their description is omitted.

As shown in FIG. 3, the motor 1A of the embodiment comprises a stator-side member 2 having a motor frame 31 and a stator core 46, and a rotor-side member 3 having a rotary shaft 50 which is rotatably supported via a bearing 40 on the stator-side member 2. A cylindrical sleeve-like bearing holder 32 is attached to the motor frame 31. An armature 48 is configured on the outer peripheral surface 33 of the bearing holder 32. The bearing 40 is fitted into the inner peripheral surface 34 of the bearing holder 32. The rotary shaft 50 is supported on the inner peripheral surface 41 of the bearing 40. A rotor case 52 is attached to the rotary shaft 50. The rotor case comprises a mounting face 53 for a recording disk, and an outer peripheral portion 55 to which a rotor magnet 56 opposed to the armature 48 is attached.

In the embodiment, an annular step portion 83 which is recessed in an inner peripheral side is formed in an upper portion (an end portion on the side of the rotor case 52) of the bearing holder 32. A lateral pressure mechanism 61 for applying a lateral pressure to the rotary shaft 50 is disposed by using the annular step portion 83.

Figure 4A:
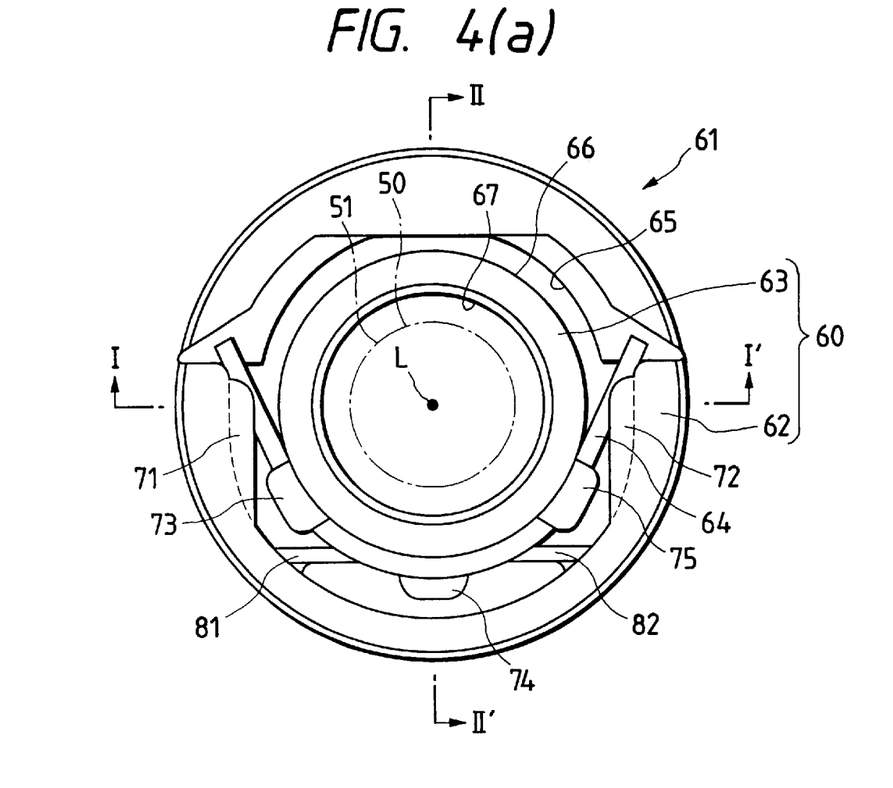
FIGS. 4(a), 4(b), and 4(c) are a plan view of the vicinity of a rotary shaft of the motor shown in FIG. 3, a section view of a ring body constituting a lateral pressure mechanism in the motor and taken along the line I–I' of FIG. 4(a), and a section view taken along the line II–II' of FIG. 4(a), respectively.
Figure 4B:
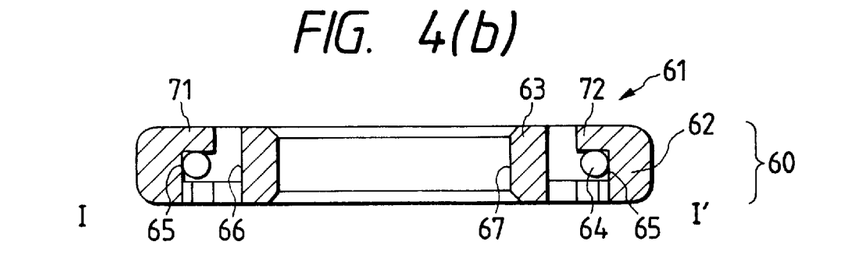
Figure 4C:
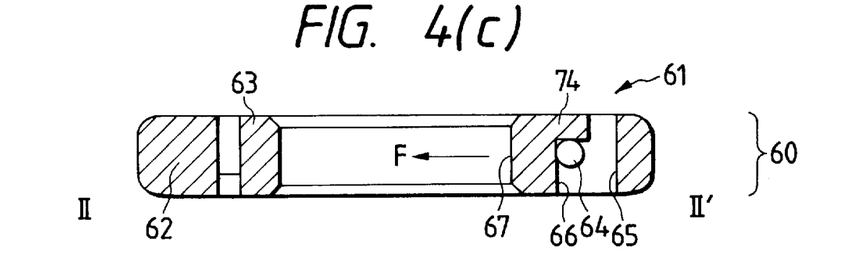

FIG. 4(*a*) is a plan view of the vicinity of the rotary shaft 50 where the lateral pressure mechanism 61 of the embodiment is configured. FIGS. 4(b) and 4(c) are section views of a ring body constituting the lateral pressure mechanism 61 and taken along the lines I–I' and II–II' of FIG. 4(a), respectively.

As shown in FIGS. 3 and 4(a), the lateral pressure mechanism 61 comprises a first ring 62 which is fixed to the inner side of the annular step portion 83 of the upper portion of the bearing holder 32 so as to surround the rotary shaft 50, a second ring 63 which is disposed inside the first ring 62 so as to surround the rotary shaft 50, and a wire spring 64 which is made of stainless steel, and which is laid over the first ring 62 so as to cause the second ring 63 to be eccentric inside the first ring 62.

In the embodiment, as shown in FIG. 4(a), the first and second rings 62 and 63 are coupled to each other by two flexible thin coupling portions 81 and 82, so as to be configured as an integral ring body 60. The second ring 63 can be radially moved inside the first ring 62 by bending the coupling portions 81 and 82. Although the second ring 63 is not directly supported on the upper end face 42 of the bearing 40, therefore, the second ring 63 is in the state where it is supported by the first ring 62 via the coupling portions 81 and 82. In the embodiment, the whole of the ring body 60 is made of a synthetic resin of an excellent sliding property, such as nylon. Alternatively, the embodiment may be configured so that the second ring 63 made of a sintered oil-impregnated alloy is supported by the first ring 62 and the coupling portions 81 and 82 which are formed by resin molding.

As shown in FIG. 4(b), two engaging portions 71 and 72 are formed on the inner peripheral portion of the first ring 62 and in positions which are symmetric about the axis L. Both the engaging portions 71 and 72 inward overhang from the upper half portion of the inner peripheral surface 65 of the first ring 62. Under the state where the wire spring 64 is bridged so that an intermediate part of the wire spring abuts against the outer peripheral surface 66 of the second ring 63 as shown in FIG. 4(a), the engaging portions 71 and 72 prevent the ends of the wire spring 64 which abut against the inner peripheral surface 65 of the first ring 62, from accidentally jumping and slipping off.

As shown in FIG. 4(c), three projections 73, 74, and 75 are formed on the upper half portion of the outer peripheral surface 66 of the second ring 63 at angular intervals of about 30°. The wire spring 64 passes below the projections 73, 74, and 75 so as to be held by the engaging portions 71 and 72 of the first ring 62. Therefore, the intermediate part of the wire spring 64 which abuts against the outer peripheral surface 66 of the second ring 63 is engaged with the projections 73, 74, and 75, and hence is prevented from accidentally jumping.

Also in the thus configured lateral pressure mechanism 61, the intermediate part of the wire spring 64 which is bent along the outer peripheral surface 66 of the second ring 63 elastically presses the second ring 63 as indicated by the arrow F. Consequently, the second ring 63 is caused to be eccentric in the direction indicated by the arrow F, so that the inner peripheral surface 67 of the second ring 63 transmits to the outer peripheral surface 51 of the rotary shaft 50, a lateral pressure in a direction which is substantially perpendicular to the axis L of the shaft. This causes the outer peripheral surface 51 of the rotary shaft 50 to be forcedly pressed against one place of the inner peripheral surface 41 of the bearing 40. Therefore, it is possible to eliminate rattling of the rotary shaft 50 which is due to a clearance between the outer peripheral surface 51 of the rotary shaft 50 and the inner peripheral surface 41 of the bearing 40.

In the same manner as Embodiment 1, also in the lateral pressure mechanism 61 of the embodiment, both the first and second rings 62 and 63 are disposed so as to surround the rotary shaft 50 and the wire spring 64 is held inside the first ring 62. Therefore, it is required only to form a space of a size which allows the first ring 62 (the ring body 60) to be disposed therein, in the periphery of the rotary shaft 50. As a result, the lateral pressure mechanism 61 can be incorporated into the small motor 1A. Since the shape-restoring force of the wire spring 64 which is supported at both the ends by the first ring 62 is output from the intermediate part of the wire spring, the wire spring 64 stably generates a high lateral pressure although the spring is so small that it can be held inside the first ring 62. Therefore, the lateral pressure mechanism 61 of the embodiment is suitable to be incorporated into a small motor. Since the lateral pressure is applied to the rotary shaft 50 from the wire spring 64 via the second ring 63 which is made of a synthetic resin of an excellent sliding property, the wire spring 64 and the rotary shaft 50 do not wear. Unlike a configuration in which the lateral pressure is applied to the rotary shaft 50 via the bearing 40, the bearing 40 is not required to be radially movable or inclinable. In this way, the embodiment has an advantage that it can be configured by a simple structure.

Since the first and second rings 62 and 63 are integrated into the ring body 60, it is not necessary to install one by one the members (the first and second rings 62 and 63, and the wire spring 64) constituting the lateral pressure mechanism 61 into the motor 1A. Therefore, the lateral pressure mechanism 61 may be individually assembled and then installed into the motor 1A. In this way, the steps of assembling the motor 1A can be simplified.

As described above, the lateral pressure mechanism for a motor of the invention is provided in that an intermediate part of a wire spring which is bridged between two engaging portions of a first ring surrounding a rotary shaft elastically abuts against the outer peripheral surface of a second ring which is radially movable inside the first ring, thereby applying a lateral pressure to the rotary shaft so as to eliminate rattling of the rotary shaft. According to the invention, therefore, both the first and second rings are disposed so as to surround the rotary shaft and the wire spring is held inside the first ring, so that, as far as a space of a size which allows the first ring to be disposed therein is formed in the periphery of the rotary shaft, the lateral pressure mechanism can be incorporated even into a small motor. Since the shape-restoring force of the wire spring which is supported at both the ends by the first ring is obtained from the intermediate part of the wire portion, a high lateral pressure can be stably obtained although the spring is so small that it can be held inside the first ring. Therefore, the lateral pressure mechanism is suitable to be incorporated into a small motor. Unlike a configuration in which the lateral pressure is directly applied from the wire spring to the rotary shaft, the lateral pressure is applied from the wire spring to the rotary shaft via the second ring. Therefore, phenomena such as wear of the wire spring and the rotary shaft do not occur. Furthermore, unlike a configuration in which the lateral pressure is applied to the rotary shaft via the bearing, the bearing is not required to be radially movable or inclinable. In this way, the invention has an advantage that it can be configured by a simple structure.

When the second ring is disposed on the end face of the bearing, the second ring can be disposed so as to be radially movable, by using, as it is, the flat portion (the upper end face of the bearing) which is conventionally formed in the motor.

When the invention is applied to a motor of the type in which the end face of the bearing on which the second ring is disposed is in a level position between lower and upper end faces of the coil, the space which serves as a dead space in a motor of the prior art, i.e., the space defined by the coil and the bearing can be effectively used. Consequently, it is not required to ensure a special space for configuring the lateral pressure mechanism inside the motor, and hence the invention is suitable for incorporating the lateral pressure mechanism into a small motor.

What is claimed is:

1. A lateral pressure mechanism for a motor comprising:

a first ring fixed to a stator-side member so as to surround a rotary shaft of a rotor-side member, said rotary shaft being rotatably supported via a bearing on said stator-side member;

a second ring disposed inside said first ring so as to surround said rotary shaft, said second ring being radially movable inside said first ring; and a wire spring which is bridged between two portions disposed on said first ring so that an intermediate part of said wire spring elastically abuts against an outer peripheral surface of said second ring.

2. A lateral pressure mechanism for a motor according to claim 1, wherein said first ring has at least two engaging portions which respectively protrude in an axial direction there from said engaging portions are separated from each other in a circumferential direction of said first ring, said wire spring is bridged between two ones of said engaging portions, and a locking portion for preventing said wire spring from slipping off is disposed in a tip end portion of each of said engaging portions.

3. A lateral pressure mechanism for a motor according to claim 1, wherein said first ring has a protrusion which protrudes toward a stator core constituting said stator-side member, and is fixed to said stator-side member under a state where said protrusion is fitted into a hole formed in said stator core.

4. A lateral pressure mechanism for a motor according to claim 1, wherein a bearing holder for holding said bearing has a step portion which is recessed in an inner peripheral side at an upper portion thereof, and said first ring is attached to said step portion.

5. A lateral pressure mechanism for a motor according to claim 1, wherein said second ring is disposed so as to be radially movable on an end face of said bearing.

6. A lateral pressure mechanism for a motor according to claim 5, wherein said end face of said bearing on which said second ring is disposed is in a level position between lower and upper end faces in an axial direction of a coil which is wound around a stator core of said stator-side member.

7. A lateral pressure mechanism for a motor according to claim 1, wherein said first and second rings are made of a synthetic resin.

8. A lateral pressure mechanism for a motor according to claim 1, wherein said first and second rings are coupled to each other by flexible coupling means.

9. A motor comprising:

a stator core around which a coil is wound;

a rotator opposed to said stator core and which relatively rotating with respect to said stator core;

a bearing rotatably supporting a rotary shaft of said rotor;

a sleeve for holding said bearing and said stator core;

a first ring fixed to said sleeve or said stator core, and disposed so as to surround said rotary shaft;

a second ring disposed inside said first ring so as to surround said rotary shaft, said second ring being radially movable inside said first ring; and a wire spring which is bridged between two engaging portions disposed on said first ring so that an intermediate part of said wire spring elastically abuts against an outer peripheral surface of said second ring.

10. A motor according to claim 9, wherein said first ring has a protrusion which protrudes toward said stator core, and is fixed to said stator-side member under a state where said protrusion is fitted into a hole formed in said stator core.

11. A motor according to claim 9, wherein said sleeve has a step portion which is recessed in an inner peripheral side at an upper portion thereof, and said first ring is fixed to said step portion.

12. A motor according to claim 9, wherein said second ring is disposed so as to be radially movable on an end face of said bearing.

13. A motor according to claim 12, wherein said end face of said bearing on which said second ring is disposed is in a level position between lower and upper end faces in an axial direction of said coil.

14. A motor according to claim 9, wherein said first and second rings are made of a synthetic resin.

15. A motor according to claim 9, wherein said first and second rings are coupled to each other by flexible coupling means.

* * * * *